(12) United States Patent
Kimba Dit Adamou et al.

(10) Patent No.: US 11,490,325 B2
(45) Date of Patent: Nov. 1, 2022

(54) ACCESS METHOD AND DEVICE

(71) Applicant: VIVO MOBILE COMMUNICATION CO., LTD., Guangdong (CN)

(72) Inventors: Boubacar Kimba Dit Adamou, Chang'an Dongguan (CN); Kai Wu, Chang'an Dongguan (CN); Wei Bao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 53 days.

(21) Appl. No.: 17/127,636

(22) Filed: Dec. 18, 2020

(65) Prior Publication Data

US 2021/0105710 A1    Apr. 8, 2021

Related U.S. Application Data

(63) Continuation of application No. PCT/CN2019/092031, filed on Jun. 20, 2019.

(30) Foreign Application Priority Data

Jun. 21, 2018  (CN) .......................... 201810646667.7

(51) Int. Cl.
*H04W 48/16* (2009.01)
*H04B 7/155* (2006.01)
(Continued)

(52) U.S. Cl.
CPC ........ *H04W 48/16* (2013.01); *H04B 7/15528* (2013.01); *H04W 28/26* (2013.01);
(Continued)

(58) Field of Classification Search
None
See application file for complete search history.

(56) References Cited

U.S. PATENT DOCUMENTS

| 2011/0310789 | A1  | 12/2011 | Hu |
| 2014/0372571 | A1* | 12/2014 | Lim .................. H04L 67/1004 709/219 |

(Continued)

FOREIGN PATENT DOCUMENTS

| CN | 101790176 A | 7/2010 |
| CN | 102170676 A | 8/2011 |

(Continued)

OTHER PUBLICATIONS

Chinese Office Action dated Dec. 16, 2020 as received in application No. 201810646667.7.

(Continued)

*Primary Examiner* — Hong S Cho
(74) *Attorney, Agent, or Firm* — Maschoff Brennan

(57) ABSTRACT

This disclosure provides an access method and a device. The method includes: sending an access request message to a second IAB node; and receiving an indication message sent by the second IAB node, where the indication message indicates that the second IAB node allows or prohibits access by the first IAB node, the indication message is determined by the second IAB node based on a reserved access resource and the access request message, and the second IAB node is a donor IAB node or a parent IAB node or a child IAB node of the first IAB node.

20 Claims, 6 Drawing Sheets

(51) Int. Cl.

| | | |
|---|---|---|
| *H04W 28/26* | (2009.01) | |
| *H04W 48/02* | (2009.01) | |
| *H04W 48/12* | (2009.01) | |
| *H04W 72/04* | (2009.01) | |
| *H04W 74/00* | (2009.01) | |
| *H04W 74/08* | (2009.01) | |
| *H04W 88/14* | (2009.01) | |

(52) U.S. Cl.
CPC ......... *H04W 48/12* (2013.01); *H04W 72/042* (2013.01); *H04W 74/002* (2013.01); *H04W 74/0833* (2013.01); *H04W 88/14* (2013.01)

(56) References Cited

U.S. PATENT DOCUMENTS

| | | |
|---|---|---|
| 2015/0124613 A1 | 5/2015 | Yu |
| 2015/0341974 A1 | 11/2015 | Wu |
| 2017/0006499 A1 | 1/2017 | Hampel |
| 2018/0063756 A1 | 3/2018 | Kiss |
| 2021/0045036 A1* | 2/2021 | Wei ....................... H04W 40/04 |
| 2021/0045041 A1* | 2/2021 | Sharma ................. H04W 76/10 |

FOREIGN PATENT DOCUMENTS

| | | |
|---|---|---|
| CN | 103109472 A | 5/2013 |
| CN | 103906266 A | 7/2014 |
| CN | 104272855 A | 1/2015 |
| CN | 107736004 A | 2/2018 |
| WO | 2013025027 A2 | 2/2013 |
| WO | WO-2019157697 A1 * | 8/2019 |

OTHER PUBLICATIONS

Written Opinion and International Search Report dated Dec. 22, 2020 as received in application No. PCT/CN2019/092031.

"TP for 38.874 capturing RAN1 agreements on IAB" 3GPP TSG RAN WG1 Meeting #93 R1-1807850, Busan Korea, May 21-25, 2018. AT&T.

* cited by examiner

ACCESS METHOD AND DEVICE

CROSS-REFERENCE TO RELATED APPLICATIONS

This application is a continuation application of International Application No. PCT/CN2019/092031 filed on Jun. 20, 2019, which claims priority to Chinese Patent Application No. 201810646667.7 filed in China on Jun. 21, 2018, both disclosures of which are incorporated herein by reference in their entireties.

TECHNICAL FIELD

Embodiments of this disclosure relate to the field of communications technologies, and specifically, to an access method and a device.

BACKGROUND

A relay technology refers to addition of one or more relay nodes between a base station and user equipment (UE). The relay node is responsible for forwarding a wireless signal for one or more times. In other words, the wireless signal passes through multiple hops before reaching the base station or the UE. For example, in simple two-hop relay, a base station-UE link is divided into two links: base station-relay station, and relay station-UE, making it possible to replace a link with poor quality with two links with good quality, so as to obtain a higher link capacity and better coverage.

In the fifth-generation communications technology (5G), it is studied to use a wireless relay as a backhaul. In a wireless relay backhaul technology, a wireless backhaul link of above 6 GHz is also used. A higher network frequency band leads to a shorter transmission distance between wireless backhaul nodes. To effectively achieve better multi-path transmission, a distance between wireless backhaul nodes needs to be even shorter, and wireless backhaul nodes are more densely deployed.

Therefore, there is an urgent need for a technical solution in which an integrated access and backhaul (IAB) node accesses another IAB node in a wireless backhaul scenario.

SUMMARY

An objective of embodiments of this disclosure is to provide an access method and a device, to resolve the issue of how an IAB accesses other IABs in a wireless backhaul scenario.

According to a first aspect, an embodiment of this disclosure provides an access method, applied to a first IAB node, where the method includes:

sending an access request message to a second IAB node; and receiving an indication message sent by the second IAB node, where the indication message indicates that the second IAB node allows or prohibits access by the first IAB node, the indication message is determined by the second IAB node based on a reserved access resource and the access request message, and the second IAB node is a donor IAB node or a parent IAB node or a child IAB node of the first IAB node.

According to a second aspect, an embodiment of this disclosure further provides an access method, applied to a second IAB node, where the method includes:

receiving an access request message sent by a first IAB node; and sending an indication message to the first IAB node based on a reserved access resource and the access request message, where the indication message indicates that the second IAB node allows or prohibits access by the first IAB node, and the second IAB node is a donor IAB node or a parent IAB node or a child IAB node of the first IAB node.

According to a third aspect, an embodiment of this disclosure further provides a first IAB node, including:

a first sending module, configured to send an access request message to a second IAB node; and a first receiving module, configured to receive an indication message sent by the second IAB node, where the indication message indicates that the second IAB node allows or prohibits access by the first IAB node, the indication message is determined by the second IAB node based on a reserved access resource and the access request message, and the second IAB node is a donor IAB node or a parent IAB node or a child IAB node of the first IAB node.

According to a fourth aspect, an embodiment of this disclosure further provides a second IAB node, including:

a second receiving module, configured to receive an access request message sent by a first IAB node; and a second sending module, configured to send an indication message to the first IAB node based on a reserved access resource and the access request message, where the indication message indicates that the second IAB node allows or prohibits access by the first IAB node, and the second IAB node is a donor IAB node or a parent IAB node or a child IAB node of the first IAB node.

According to a fifth aspect, an embodiment of this disclosure further provides an IAB node, including: a processor, a memory, and a program stored in the memory and capable of running on the processor, where when the program is executed by the processor, the steps of the access method according to the first aspect or the second aspect are implemented.

According to a sixth aspect, an embodiment of this disclosure further provides a computer-readable storage medium, where the computer-readable storage medium stores a program, and when the program is executed by a processor, the steps of the access method according to the first aspect or the second aspect are implemented.

In the embodiments of this disclosure, the first IAB node sends the access request message to the second IAB node, and then receives the indication message that is sent by the second IAB node based on the reserved access resource (which may include a reserved access resource configured by the second IAB node for the first IAB node, or may not include the reserved access resource configured by the second IAB node for the first IAB node) and the access request message, where the indication message indicates that the second IAB node allows or prohibits access by the first IAB node. This can ensure that the first IAB node accesses an appropriate IAB node as soon as possible, thereby resolving the issue of how an IAB accesses other IABs in the wireless backhaul scenario.

BRIEF DESCRIPTION OF DRAWINGS

Persons of ordinary skill in the art will be clear about other advantages and benefits by reading the detailed description of the optional embodiments below. The accompanying drawings are merely intended to illustrate the objectives of the optional embodiments and should not be interpreted as limiting this disclosure. Throughout the accompanying drawings, the same reference numerals represent the same components. In the drawings.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

The terms "include", "comprise", and any other variants thereof in the specification and claims of this disclosure are intended to cover a non-exclusive inclusion. For example, a process, method, system, product, or device that includes a series of steps or units is not necessarily limited to those expressly listed steps or units, but may include other steps or units that are not expressly listed or are inherent to the process, method, system, product, or device. Moreover, the use of "and/or" in the specification and claims represents presence of at least one of the connected objects. For example, A and/or B means three cases: A alone, B alone, or A and B together.

In the embodiments of this disclosure, the terms such as "exemplary" or "for example" are used to represent an example, an illustration, or a description. Any embodiment or design scheme described as "exemplary" or "for example" in the embodiments of this disclosure should not be construed as being more preferred or advantageous than other embodiments or design schemes. To be precise, the use of the terms such as "exemplary" or "for example" is intended to present a related concept in a specific manner.

Figure 1:
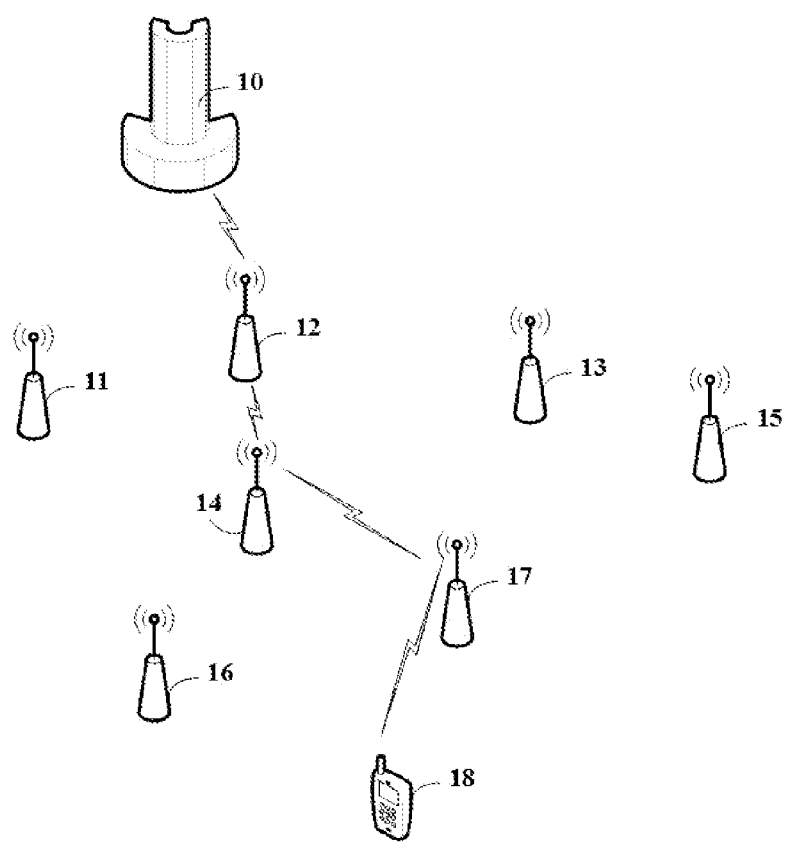
FIG. 1 is a schematic architectural diagram of a wireless communications system according to an embodiment of this disclosure.

In the embodiments of this disclosure, a wireless communications system may be fifth-generation (5G) new radio (NR), a long term evolution (LTE) system, or a subsequent evolved communications system. Referring to FIG. 1, the wireless communications system includes: UE 18, IAB nodes 11 to 17, and a donor IAB (DIAB) node 10. One or more of the IAB nodes 11 to 17 are connected to the DIAB node 10 through a wireless interface. The IAB nodes 11 to 17 are connected to each other through a wireless interface.

It should be noted that the IAB nodes 11 to 17 in FIG. 1 each may be a complete base station or a DU of a base station whose centralized unit (CU) and distributed unit (DU) are separated. It can be understood that when the CU and the DU are separated, one CU can manage a plurality of DUs. The base station may be a base transceiver station (BTS) in global system for mobile communications (GSM) or code division multiple access (CDMA), or may be a NodeB in wideband code division multiple access (WCDMA), or may be an evolved NodeB (eNB, or e-NodeB) in LTE or a 5G base station (gNB). This is not limited in the embodiments of this disclosure.

As shown in FIG. 1, the IAB node 17 is not directly connected to the DIAB node 10, and the IAB node 17 may perform backhaul processing through the IAB node 14 or the IAB node 12 or the IAB node 16. The IAB node 13, the IAB node 14, the IAB node 15, and the IAB node 16 in the figure may serve as parent IAB (PIAB) nodes of the IAB node 17, that is, the IAB node 17 is a child IAB node of the IAB node 13, the IAB node 14, the IAB node 15, and the IAB node 16. It can be understood that one or more PIAB nodes of the IAB node 17 may also be considered as one or more DIAB nodes of the IAB node 17.

When a link failure occurs in backhaul between an IAB node and a PIAB node or DIAB node or child IAB node of the IAB node, the IAB node needs to select a new PIAB node or DIAB node or child IAB node as soon as possible.

Figure 2:
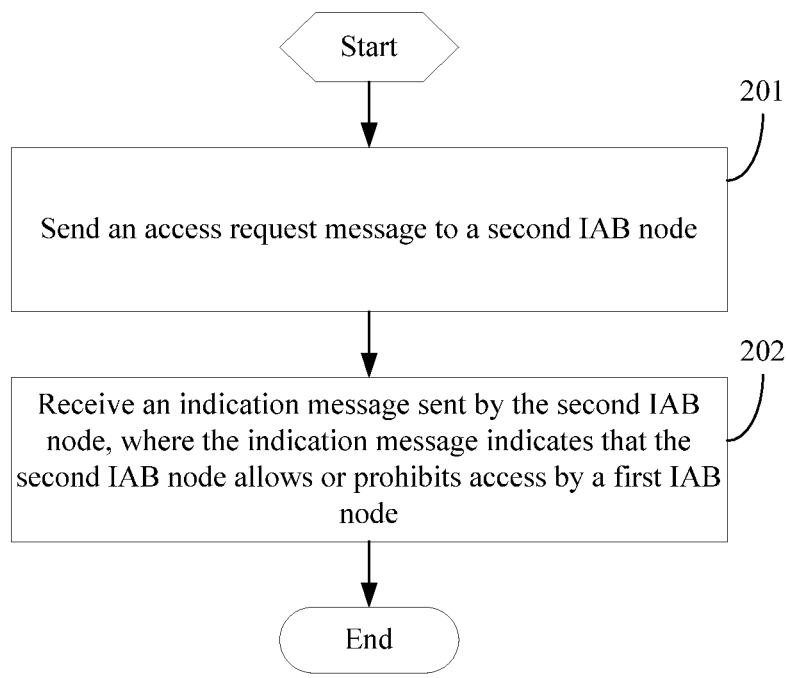
FIG. 2 is a flowchart 1 of an access method according to an embodiment of this disclosure.

Referring to FIG. 2, an embodiment of this disclosure provides an access method. The method is performed by a first IAB node, and includes the following specific steps:

Step 201: Send an access request message to a second IAB node.

Step 202: Receive an indication message sent by the second IAB node, where the indication message indicates that the second IAB node allows or prohibits access by the first IAB node.

In this embodiment of this disclosure, the indication message may be determined by the second IAB node based on a reserved access resource (for example, a random access channel resource) and the access request message.

It should be noted that the reserved access resource may include a reserved access resource configured by the second IAB node for the first IAB node, or may not include the reserved access resource configured by the second IAB node for the first IAB node.

Specifically, the reserved access resource may include: the reserved access resource of the first IAB node that is configured by the second IAB node. For example, if the second IAB node has reserved an access resource for the first IAB node, after receiving the access request message, the second IAB node may notify the first IAB node that access is allowed or notify the first IAB node that access is prohibited.

Specifically, the reserved access resource may not include: the reserved access resource of the first IAB node that is configured by the second IAB node, that is, the reserved access resource of the first IAB node is not configured. For example, if the second IAB node does not reserve an access resource for the first IAB node, after receiving the access request message, the second IAB node may notify the first IAB node that access is allowed or notify the first IAB node that access is prohibited.

In this embodiment of this disclosure, the second IAB node may be a donor IAB (DIAB) node or a parent IAB (PIAB) node or a child IAB node of the first IAB node, so that bidirectional configuration between the two IAB nodes can be ensured.

In some embodiments of this disclosure, after step 202, the method further includes: determining whether the indication message is received; and if the indication message is not received, continuing sending the access request message to the second JAB node; or if the indication message is received, performing corresponding processing based on the indication message, for example, accessing the second IAB node or continuing to initiate access to another IAB node. This can ensure that the first IAB node receives the indication message for responding to the access request message, and ensure that the first IAB node can perform corresponding processing in time based on the indication message.

In some other embodiments of this disclosure, if the indication message is not received, the method may further include: obtaining a quantity of times of sending the access request message; and when the quantity of times is greater than or equal to a predetermined quantity of times, stopping sending the access request message to the second IAB node. For example, if the access request message has been currently sent for 5 times, and the predetermined quantity of times is 4 times, the first IAB node stops sending the access request message to the second IAB node, so that a quantity of access request messages sent by the first IAB node to the second IAB node can be controlled, to avoid waste of resources.

In some embodiments of this disclosure, before step 201, the method may further include: receiving information about the reserved access resource of the first IAB node that is sent by the second IAB node, that is, the second IAB node has configured the reserved access resource for the first IAB node. Based on this, in step 202, the first IAB node sends the access request message to the second IAB node based on the information about the reserved access resource of the first IAB node. The information about the reserved access resource is used to indicate the reserved access resource configured by the second IAB node for the first IAB node.

In some embodiments of this disclosure, the indication message may be a random access response (RAR) message carried on a physical downlink control channel (PDCCH) or a physical downlink shared channel (PDSCH), and the random access response message includes: a reserved bit or a specific code point used to indicate that access by the first IAB node is prohibited.

For example, a modulation and coding scheme (MCS) has 4 bits, and when all the bits are set to "1", it indicates that access by the first IAB node is prohibited, that is, "1111" means that the second IAB node prohibits the access by the first IAB node. It should be noted that a specific form of the specific code point is not limited in this embodiment of this disclosure.

In some embodiments of this disclosure, the second IAB node may be a donor IAB node or a parent IAB node or a child IAB node that has been previously accessed by the first IAB node, or the second IAB node may be a donor IAB node or a parent IAB node or a child IAB node around the first IAB node, where the surrounding donor IAB node or parent IAB node or child IAB node may send the information about the configured reserved access resource to the first IAB node through the second IAB node. In other words, the second IAB node may be an IAB node that has been previously accessed by the first IAB node, or an IAB node that has not been accessed by the first IAB node before.

In some embodiments of this disclosure, before the sending an access request message to a second IAB node, the method may further include: determining whether the second IAB node has reserved an access resource for the first JAB node; and if the second IAB node has reserved an access resource for the first IAB node, performing the step of sending an access request message to a second JAB node; or if the second IAB node does not reserve the access resource for the first IAB node, skipping performing the step of sending an access request message to a second IAB node. That is, when the first IAB node is not configured with the reserved access resource, the first IAB node can quickly give up accessing the second IAB node, and access another DIAB node or PIAB node or child IAB node as soon as possible.

In some embodiments of this disclosure, the reserved access resource may include one or more of the following: a random access preamble, where the random access preamble is used to identify a UE identity during random access; a window configuration of the random access response message; and a quantity of retransmissions of a random access channel. It should be noted that, the window configuration of the random access response message and the quantity of retransmissions of the random access channel are not specifically limited in this embodiment of this disclosure.

In this embodiment of this disclosure, the first IAB node sends the access request message to the second IAB node, and then receives the indication message that is sent by the second IAB node based on the reserved access resource and the access request message, where the indication message indicates that the second IAB node allows or prohibits access by the first IAB node. This can ensure that the first IAB node accesses an appropriate IAB node as soon as possible, thereby resolving the issue of how an IAB accesses other IABs in the wireless backhaul scenario.

Figure 3:
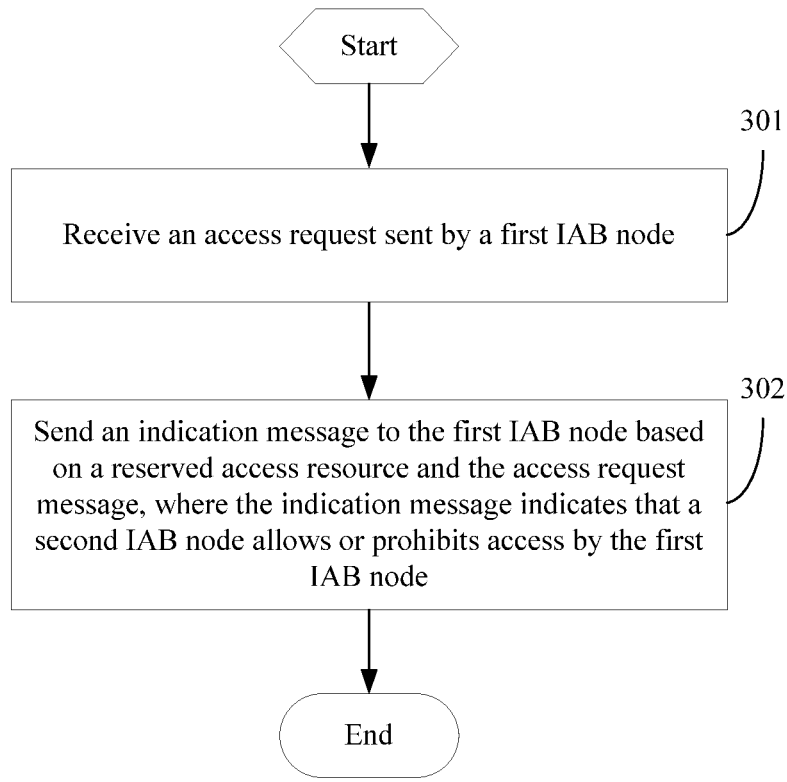
FIG. 3 is a flowchart 2 of an access method according to an embodiment of this disclosure.

Referring to FIG. 3, an embodiment of this disclosure provides another access method. The method may be performed by a second IAB node, and the second IAB node may be a donor IAB (DIAB) node or a parent IAB (PIAB) node or a child IAB node of a first IAB node. The method includes the following specific steps:

Step 301: Receive an access request message sent by the first IAB node.

Step 302: Send an indication message to the first IAB node based on a reserved access resource configured by the second IAB node for the first IAB node and the access request message, where the indication message indicates that the second IAB node allows or prohibits access by the first IAB node.

It should be noted that the reserved access resource may include the reserved access resource configured by the second IAB node for the first IAB node, or may not include the reserved access resource configured by the second IAB node for the first IAB node.

Specifically, the reserved access resource may include: the reserved access resource of the first IAB node that is configured by the second IAB node. For example, if the second IAB node has reserved an an access resource for the first IAB node, after receiving the access request message, the second IAB node may notify the first IAB node that access is allowed or notify the first IAB node that access is prohibited.

Specifically, the reserved access resource may not include: the reserved access resource of the first IAB node that is configured by the second IAB node, that is, the reserved access resource of the first IAB node is not configured. For example, if the second IAB node does not reserve an access resource for the first IAB node, after receiving the access request message, the second IAB node may notify the first IAB node that access is allowed or notify the first IAB node that access is prohibited.

In some embodiments of this disclosure, before or after step 301 or at the same time with step 301, the method further includes: sending information about the reserved access resource of the first IAB node to the first IAB node. Based on this, step 301 is specifically: receiving the access request message that is sent by the second IAB node based on the information about the reserved access resource of the first IAB node.

In some embodiments of this disclosure, the indication message may be an RAR message carried on a PDCCH or a PDSCH, and the random access response message includes: a reserved bit or a specific code point used to indicate that access by the first IAB node is prohibited. For example, a modulation and coding scheme (MCS) has 4 bits, and when all the bits are set to "1", it indicates that access by the first IAB node is prohibited, that is, "1111" means that the second IAB node prohibits the access by the first IAB node. It should be noted that a specific form of the specific code point is not limited in this embodiment of this disclosure.

In some embodiments of this disclosure, the reserved access resource may include one or more of the following: a random access preamble; a window configuration of the random access response message; and a quantity of retransmissions of a random access channel. It should be noted that, the window configuration of the random access response message and the quantity of retransmissions of the random access channel are not specifically limited in this embodiment of this disclosure.

In this embodiment of this disclosure, the second IAB node sends the indication message to the first IAB node based on the reserved access resource and the access request message, where the indication message indicates that the second IAB node allows or prohibits access by the first IAB node. This can ensure that the first IAB node accesses an appropriate IAB node as soon as possible, thereby resolving the issue of how an IAB accesses other IABs in the wireless backhaul scenario.

Figure 4:
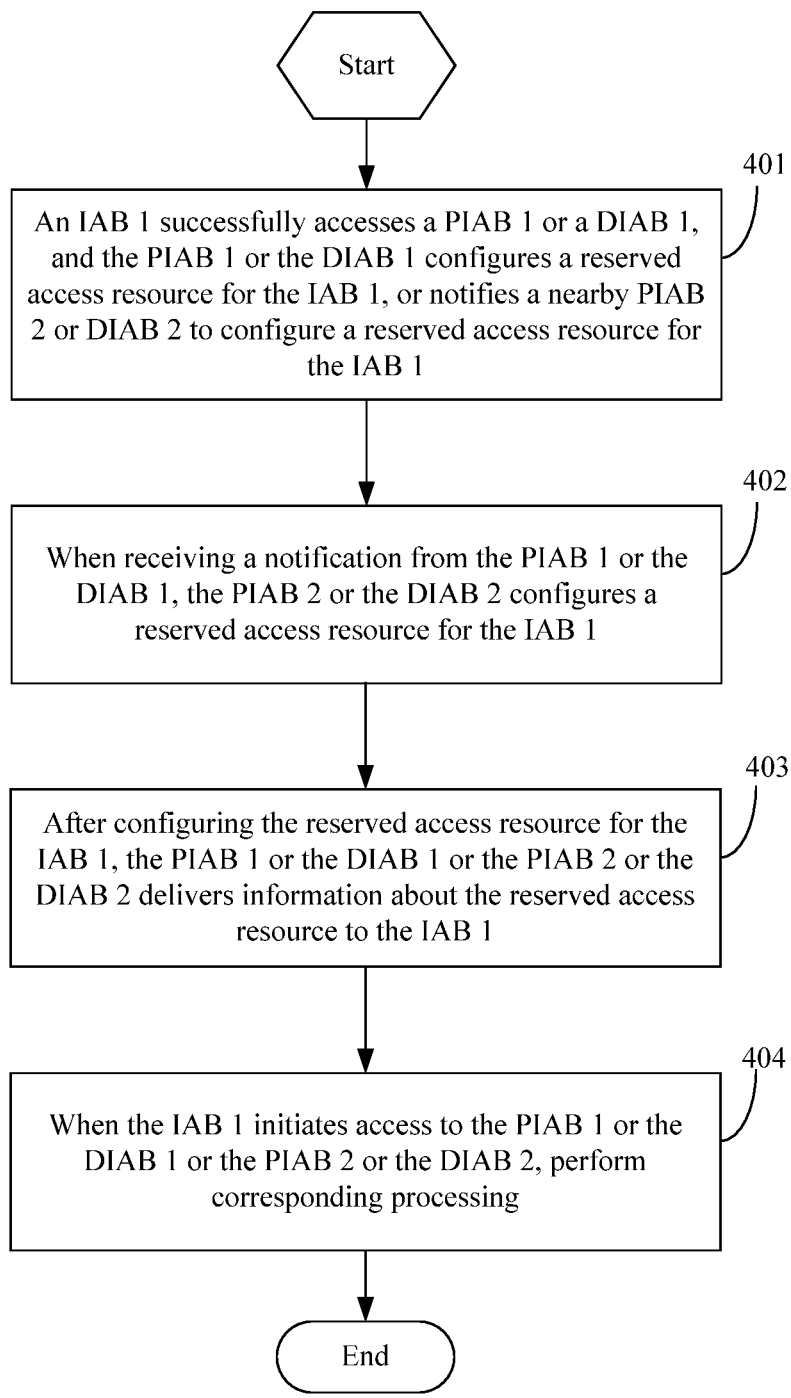
FIG. 4 is a flowchart 3 of an access method according to an embodiment of this disclosure.

Referring to FIG. 4, an embodiment of this disclosure provides still another access method, including steps 401 to 404.

Step 401: An IAB 1 successfully accesses a PIAB 1 or a DIAB 1, and the PIAB 1 or the DIAB 1 configures a reserved access resource for the IAB 1, or notifies a nearby PIAB 2 or DIAB 2 to configure a reserved access resource, for example, a random access channel (RACH) resource, for the IAB 1.

It should be noted that the IAB 1 may also be understood as a first IAB node, the PIAB 1 may also be understood as a first parent IAB node, the DIAB 1 may also be understood as a first donor IAB node, the PIAB 2 may also be understood as a second parent IAB node, and the DIAB 2 may also be understood as a second donor IAB node.

Step 402: When receiving a notification from the PIAB 1 or the DIAB 1, the PIAB 2 or the DIAB 2 configures a reserved access resource for the IAB 1.

The reserved access resource includes one or more of the following:

a random access preamble, used to identify a UE identity during random access;

a configuration window of a random access response message (MSG2); and a quantity of retransmissions of a random access channel (RACH).

It should be noted that step 402 is an optional step.

Step 403: After configuring the reserved access resource for the IAB 1, the PIAB 1 or the DIAB 1 or the PIAB 2 or the DIAB 2 delivers information about the reserved access resource to the IAB 1.

In step 403, if the IAB 1 is not yet connected to the PIAB 2 or the DIAB 2, the PIAB 2 or the DIAB 2 may deliver the information about the reserved access resource to the IAB 1 through the PIAB 1 or the DIAB 1 to which the IAB 1 has been connected.

Step 404: When the IAB 1 initiates access to the PIAB 1 or the DIAB 1 or the PIAB 2 or the DIAB 2, perform corresponding processing.

Example 1: If a preamble used by the IAB 1 to initiate access is a preamble reserved by the PIAB 1 or the DIAB 1 or the PIAB 2 or the DIAB 2, behavior of the PIAB 1 or the DIAB 1 or the PIAB 2 or the DIAB 2 includes the following:

(a) If the PIAB 1 or the DIAB 1 or the PIAB 2 or the DIAB 2 can accept the IAB 1, the PIAB 1 or the DIAB 1 or the PIAB 2 or the DIAB 2 notifies the IAB 1 to access.

(b) If the PIAB 1 or the DIAB 1 or the PIAB 2 or the DIAB 2 cannot accept the IAB 1, the PIAB 1 or the DIAB 1 or the PIAB 2 or the DIAB 2 may use a reserved bit or a specific code point in an RAR PDCCH or PDSCH to indicate that access by the IAB 1 is prohibited. It may be understood that specific forms of the reserved bit and the specific code point are not limited in this embodiment of this disclosure.

Example 2: If the PIAB 1 or the DIAB 1 or the PIAB 2 or the DIAB 2 does not configure a reserved access resource for the IAB 1:

Behavior of the IAB 1 includes the following:

(a) The IAB 1 considers by default that a cell of the PIAB 1 or the DIAB 1 or the PIAB 2 or the DIAB 2 cannot be used for access by the IAB 1.

(b) The IAB 1 initiates access to the PIAB 1 or the DIAB 1 or the PIAB 2 or the DIAB 2. When the PIAB 1 or the DIAB 1 or the PIAB 2 or the DIAB 2 receives a preamble of the IAB 1, behavior of the PIAB 1 or the DIAB 1 or the PIAB 2 or the DIAB 2 may include any one of the following:

(1) notifying the JAB 1 to access; and (2) using a reserved bit or a specific code point in a random access response (RAR) PDCCH/PDSCH to indicate that access by the IAB 1 is prohibited.

It should be noted that if the PIAB 1 or the DIAB 1 or the PIAB 2 or the DIAB 2 does not return the RAR to the IAB 1, the IAB 1 may still attempt to send the preamble until a quantity of times of sending the preamble sent exceeds a preset maximum quantity of transmissions.

An embodiment of this disclosure further provides a first IAB node. Because the problem-solving principles of the first IAB node are similar to those of the access method in the embodiments of this disclosure, for the implementation of the first IAB node, reference may be made to the implementation of the method, and details are not repeated.

Figure 5:
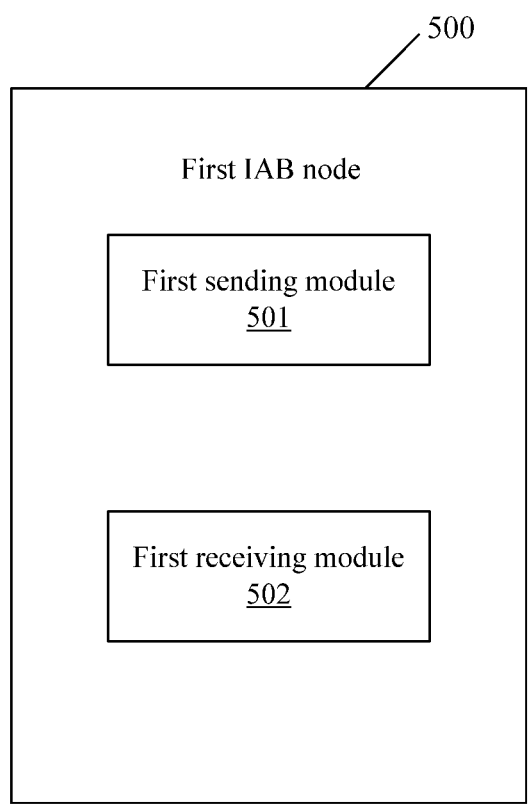
FIG. 5 is a schematic structural diagram 1 of a first IAB node according to an embodiment of this disclosure.

Referring to FIG. 5, the first IAB node 500 includes:

a first sending module 501, configured to send an access request message to a second IAB node; and a first receiving module 502, configured to receive an indication message sent by the second IAB node, where the indication message indicates that the second IAB node allows or prohibits access by the first IAB node.

The indication message may be determined by the second IAB node based on a reserved access resource and the access request message, and the second IAB node may be a donor IAB node or a parent IAB node or a child IAB node of the first IAB node.

In some embodiments of this disclosure, the first IAB node may further include: a processing module, configured to: determine whether the first receiving module 502 receives the indication message; and if the indication message is not received, notify the first sending module to continue sending the access request message to the second IAB node; or if the indication message is received, perform corresponding processing based on the indication message.

In some other embodiments of this disclosure, the processing module may be further configured to: when the first receiving module does not receive the indication message, obtain a quantity of times of sending the access request message, and when the quantity of times is greater than or equal to a predetermined quantity of times, notify the first sending module to stop sending the access request message to the second IAB node.

In some embodiments of this disclosure, the first receiving module 502 may be further configured to: before the first sending module sends the access request message to the second IAB node, receive information about the reserved access resource of the first IAB node that is sent by the second IAB node; and the first sending module may be further configured to send the access request message to the second IAB node based on the information about the reserved access resource of the first IAB node.

In some embodiments of this disclosure, the indication message is a random access response RAR message carried on a PDCCH or a PDSCH, and the random access response message includes: a reserved bit or a specific code point used to indicate that access by the first IAB node is prohibited.

In some embodiments of this disclosure, the second IAB node may be a donor IAB node or a parent IAB node or a child IAB node that has been previously accessed by the first IAB node, or the second IAB node may be a donor IAB node or a parent IAB node or a child IAB node around the first IAB node.

In some embodiments of this disclosure, the reserved access resource may include one or more of the following: a random access preamble; a window configuration of the random access response message; and a quantity of retransmissions of a random access channel.

The first IAB node provided in this embodiment of this disclosure may perform the foregoing method embodiment, with similar implementation principles and similar technical effects. Details are not repeated herein in this embodiment.

An embodiment of this disclosure further provides a second IAB node. Because the problem-solving principles of the second IAB node are similar to those of the access method in the embodiments of this disclosure, for the implementation of the second IAB node, reference may be made to the implementation of the method, and details are not repeated.

Figure 6:
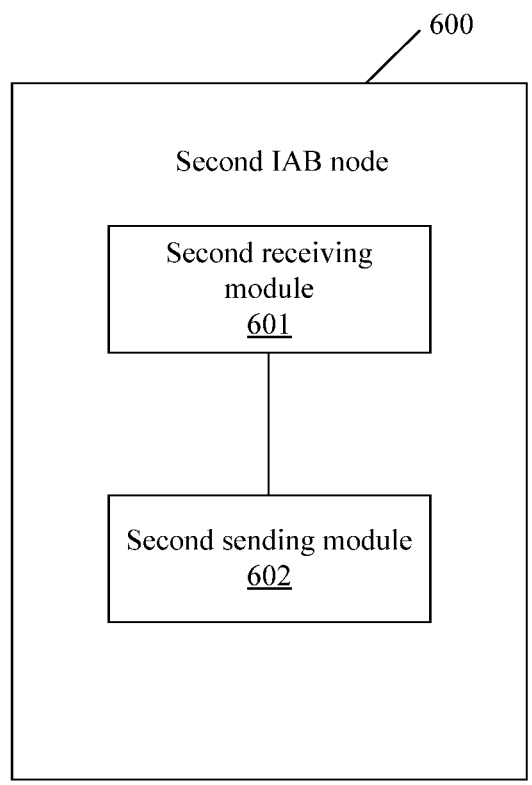
FIG. 6 is a schematic structural diagram 1 of a second IAB node according to an embodiment of this disclosure.

Referring to FIG. 6, the second IAB node 600 includes:
a second receiving module 601, configured to receive an access request message sent by a first IAB node; and
a second sending module 602, configured to send an indication message to the first IAB node based on a reserved access resource and the access request message, where the indication message indicates that the second IAB node allows or prohibits access by the first IAB node.

The second IAB node may be a donor IAB node or a parent IAB node or a child IAB node of the first IAB node.

In some embodiments of this disclosure, the second sending module 602 may be further configured to send information about the reserved access resource of the first IAB node to the first IAB node; and the second receiving module 601 may be further configured to receive the access request message that is sent by the second IAB node based on the information about the reserved access resource of the first IAB node.

In some embodiments of this disclosure, the indication message may be a random access response RAR message carried on a PDCCH or a PDSCH, and the random access response message may include: a reserved bit or a specific code point used to indicate that access by the first IAB node is prohibited.

In some embodiments of this disclosure, the second IAB node may be a donor IAB node or a parent IAB node or a child IAB node that has been previously accessed by the first IAB node, or the second IAB node may be a donor IAB node or a parent IAB node or a child IAB node around the first IAB node.

In some embodiments of this disclosure, the reserved access resource may include one or more of the following: a random access preamble; a window configuration of the random access response message; and a quantity of retransmissions of a random access channel.

The second IAB node provided in this embodiment of this disclosure may perform the foregoing method embodiment, with similar implementation principles and similar technical effects. Details are not repeated herein in this embodiment.

Figure 7:
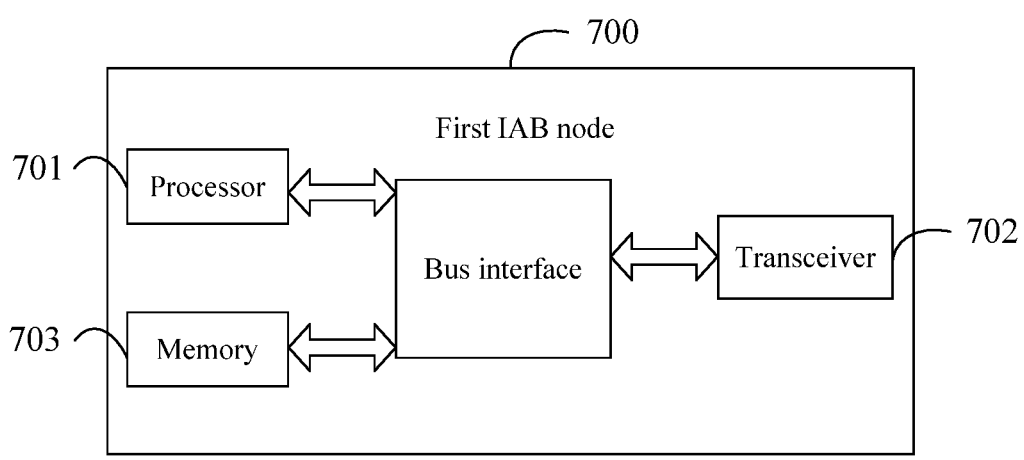
FIG. 7 is a schematic structural diagram 2 of a first IAB node according to an embodiment of this disclosure.

Referring to FIG. 7, an embodiment of this disclosure provides a first IAB node 700, including a processor 701, a transceiver 702, a memory 703, and a bus interface.

The processor 701 may be responsible for bus architecture management and general processing. The memory 703 may store data used when the processor 701 performs an operation.

In this embodiment of this disclosure, the first IAB node 700 may further include: a computer program stored in the memory 703 and capable of running on the processor 701. When the computer program is executed by the processor 701, the following is implemented: sending an access request message to a second IAB node; and receiving an indication message sent by the second IAB node, where the indication message indicates that the second IAB node allows or prohibits access by the first IAB node, the indication message is determined by the second IAB node based on a reserved access resource and the access request message, and the second IAB node is a donor IAB node or a parent IAB node or a child IAB node of the first IAB node.

In FIG. 7, a bus architecture may include any quantity of interconnected buses and bridges, and specifically connect together various circuits of one or more processors represented by the processor 701 and a memory represented by the memory 703. The bus architecture may further connect various other circuits such as a peripheral device, a voltage regulator, and a power management circuit. These are well known in the art, and therefore are not further described in this embodiment of this disclosure. A bus interface provides an interface. The transceiver 702 may be a plurality of elements, including a transmitter and a receiver, and provides units configured to perform communication with various other apparatuses over a transmission medium.

The first IAB node provided in this embodiment of this disclosure may perform the foregoing method embodiment, with similar implementation principles and similar technical effects. Details are not repeated herein in this embodiment.

Figure 8:
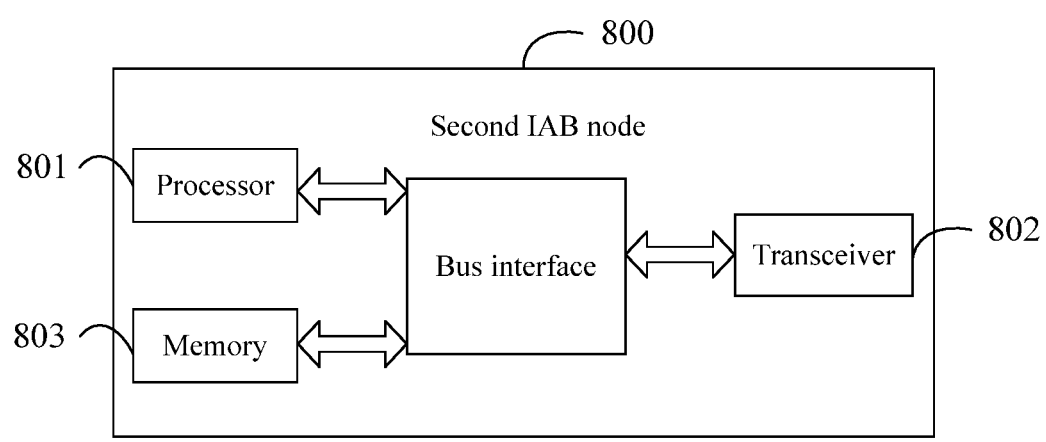
FIG. 8 is a schematic structural diagram 2 of a second IAB node according to an embodiment of this disclosure.

Referring to FIG. 8, an embodiment of this disclosure provides a second IAB node 800, including a processor 801, a transceiver 802, a memory 803, and a bus interface.

The processor 801 may be responsible for bus architecture management and general processing. The memory 803 may store data used when the processor 801 performs an operation.

In this embodiment of the this disclosure, the second IAB node 800 may further include: a computer program stored in the memory 803 and capable of running on the processor 801. When the computer program is executed by the processor 801, the following is implemented: receiving an access request message sent by a first IAB node; and sending an indication message to the first IAB node based on a reserved access resource configured by the second IAB node for the first IAB node and the access request message, where the indication message indicates that the second IAB node allows or prohibits access by the first IAB node, the reserved access resource is information about the reserved access resource configured by the second IAB node for the first IAB node, and the second IAB node is a donor IAB node or a parent IAB node or a child IAB node of the first IAB node.

In FIG. 8, a bus architecture may include any quantity of interconnected buses and bridges, and specifically connect together various circuits of one or more processors represented by the processor 801 and a memory represented by the memory 803. The bus architecture may further connect various other circuits such as a peripheral device, a voltage regulator, and a power management circuit. These are well known in the art, and therefore are not further described in this embodiment of this disclosure. A bus interface provides an interface. The transceiver 802 may be a plurality of elements, including a transmitter and a receiver, and provides units configured to perform communication with various other apparatuses over a transmission medium.

The second IAB node provided in this embodiment of this disclosure may perform the foregoing method embodiment, with similar implementation principles and similar technical effects. Details are not repeated herein in this embodiment.

The steps of the method or algorithm described in combination with the content disclosed in this disclosure may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory, or any other form of storage medium well-known in the art. For example, a storage medium is coupled to the processor, enabling the processor to read information from the storage medium or write information into the storage medium. The storage medium may also be a component of the processor. The processor and the storage medium may be located in an application-specific integrated circuit (ASIC). In addition, the ASIC may be located in a core network interface device. The processor and the storage medium may exist in the core network interface device as discrete components.

Persons skilled in the art should be aware that in the foregoing one or more examples, functions described in this disclosure may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The objectives, technical solutions, and benefits of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions in this disclosure shall fall within the protection scope of this disclosure.

Persons skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may be implemented in the form of one or more computer program products implemented on a computer-usable storage medium (including but not limited to a disk memory, a compact disc read-only memory (CD-ROM), an optical memory, and the like) that includes computer-usable program code.

The embodiments of this disclosure are described with reference to the flowcharts and/or block diagrams of the method, the device (system), and the computer program product according to the embodiments of this disclosure. It should be understood that each process and/or each block in the flowcharts and/or the block diagrams, or a combination of a process and/or a block in the flowcharts and/or the block diagrams may be implemented by computer program instructions. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can guide the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, persons skilled in the art can make various modifications and variations to the embodiments of this disclosure without departing from the spirit and scope of this disclosure. This disclosure is intended to cover these modifications and variations to the embodiments of this disclosure provided that they fall within the protection scope defined by the claims of this disclosure and their equivalent technologies.

What is claimed is:

1. An access method, applied to a first integrated access and backhaul IAB node, wherein the method comprises:
   sending an access request message to a second IAB node; and receiving an indication message sent by the second IAB node, wherein the indication message indicates that the second IAB node allows or prohibits access by the first IAB node, the indication message is determined by the second IAB node based on a reserved access resource and the access request message, and the second IAB node is a donor IAB node or a parent IAB node or a child IAB node of the first IAB node.

2. The method according to claim 1, further comprising:
determining whether the indication message is received; and if the indication message is not received, continuing sending the access request message to the second IAB node; or if the indication message is received, performing corresponding processing based on the indication message.

3. The method according to claim 2, wherein if the indication message is not received, the method further comprises:

obtaining a quantity of times of sending the access request message; and when the quantity of times is greater than or equal to a predetermined quantity of times, stopping sending the access request message to the second IAB node.

4. The method according to claim 1, wherein before the sending an access request message to a second IAB node, the method further comprises:

receiving information about the reserved access resource of the first IAB node that is sent by the second IAB node; and the sending an access request message to a second IAB node comprises:

sending the access request message to the second IAB node based on the information about the reserved access resource of the first IAB node.

5. The method according to claim 1, wherein the indication message is a random access response message carried on a physical downlink control channel PDCCH or a physical downlink shared channel PDSCH, and the random access response message comprises: a reserved bit or a specific code point used to indicate that access by the first IAB node is prohibited.

6. The method according to claim 1, wherein the second IAB node is a donor IAB node or a parent IAB node or a child IAB node that has been previously accessed by the first IAB node, or the second IAB node is a donor IAB node or a parent IAB node or a child IAB node around the first IAB node.

7. The method according to claim 1, wherein before the sending an access request message to a second IAB node, the method further comprises:

determining whether the second IAB node has reserved an access resource for the first IAB node; and if the second IAB node has reserved an access resource for the first IAB node, performing the step of sending an access request message to a second IAB node.

8. The method according to claim 1, wherein the reserved access resource comprises one or more of the following:

a random access preamble;
a window configuration of the random access response message; and
a quantity of retransmissions of a random access channel.

9. An access method, applied to a second integrated access and backhaul IAB node, wherein the method comprises:

receiving an access request message sent by a first IAB node; and sending an indication message to the first IAB node based on a reserved access resource and the access request message, wherein the indication message indicates that the second IAB node allows or prohibits access by the first IAB node, and the second IAB node is a donor IAB node or a parent IAB node or a child IAB node of the first IAB node.

10. The method according to claim 9, further comprising:
sending information about the reserved access resource of the first IAB node to the first IAB node; and the receiving an access request message sent by a first IAB node comprises:

receiving the access request message that is sent by the second IAB node based on the information about the reserved access resource of the first IAB node.

11. The method according to claim 10, wherein the second IAB node is a donor IAB node or a parent IAB node or a child IAB node that has been previously accessed by the first IAB node, or the second IAB node is a donor IAB node or a parent IAB node or a child IAB node around the first IAB node.

12. The method according to claim 9, wherein the indication message is a random access response RAR message carried on a physical downlink control channel PDCCH or a physical downlink shared channel PDSCH, and the random access response message comprises: a reserved bit or a specific code point used to indicate that access by the first IAB node is prohibited.

13. The method according to claim 9, wherein the reserved access resource comprises one or more of the following:

a random access preamble;
a window configuration of the random access response message; and
a quantity of retransmissions of a random access channel.

14. A first integrated access and backhaul IAB node, comprising a processor, a memory, and a program stored in the memory and capable of running on the processor, wherein the program is executed by the processor to:

send an access request message to a second IAB node; and receive an indication message sent by the second IAB node, wherein the indication message indicates that the second IAB node allows or prohibits access by the first IAB node, the indication message is determined by the second IAB node based on a reserved access resource and the access request message, and the second IAB node is a donor IAB node or a parent IAB node or a child IAB node of the first IAB node.

15. The first IAB node according to claim 14, wherein the program is further executed by the processor to: determine whether the indication message is received; and if the indication message is not received, continue sending the access request message to the second IAB node; or if the indication message is received, perform corresponding processing based on the indication message.

16. The first IAB node according to claim 15, wherein the program is further executed by the processor to: when the indication message is not received, obtain a quantity of times of sending the access request message, and when the quantity of times is greater than or equal to a predetermined quantity of times, stop sending the access request message to the second IAB node.

17. The first IAB node according to claim 14, wherein the program is further executed by the processor to: before sending the access request message to the second IAB node, receive information about the reserved access resource of the first IAB node that is sent by the second IAB node; and
send the access request message to the second IAB node based on the information about the reserved access resource of the first IAB node.

18. A second integrated access and backhaul IAB node, comprising a processor, a memory, and a program stored in the memory and capable of running on the processor, wherein the program is executed by the processor to implement the access method according to claim 9.

19. A non-transitory computer-readable storage medium, wherein the computer-readable storage medium stores a program, and when the program is executed by a processor, the steps of the access method according to claim 1 are implemented.

20. A non-transitory computer-readable storage medium, wherein the computer-readable storage medium stores a program, and when the program is executed by a processor, the steps of the access method according to claim 9 are implemented.

* * * * *